July 21, 1925.

E. G. GILSON

LUBRICATION OF BEARINGS

Filed April 3, 1924

1,546,890

Inventor
Emery G. Gilson
by
His Attorney

Patented July 21, 1925.

1,546,890

UNITED STATES PATENT OFFICE.

EMERY G. GILSON, OF COLONIE, NEW YORK, ASSIGNOR TO GENERAL ELECTRIC COMPANY, A CORPORATION OF NEW YORK.

LUBRICATION OF BEARINGS.

Application filed April 3, 1924. Serial No. 704,069.

*To all whom it may concern:*

Be it known that I, EMERY G. GILSON, a citizen of the United States, residing at Colonie, in the county of Albany, State of New York, have invented certain new and useful Improvements in Lubrication of Bearings, of which the following is a specification.

The present invention relates to the lubrication of bearings, and particularly to the lubrication of bearings by means of one or more oil rings.

The object of my invention is to provide an improved arrangement for lubricating a bearing by means of an oil ring wherein the oil is evenly distributed to all parts of the bearing and wherein a large quantity of oil will be caused to circulate through the bearing to cool it.

For a consideration of what I believe to be novel and my invention, attention is directed to the accompanying description and the claims appended thereto.

Figure 1:
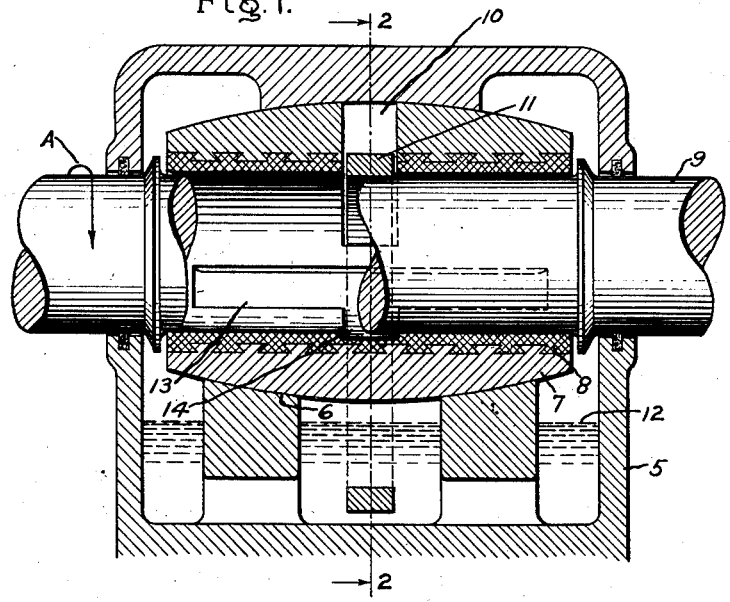
Figure 2:
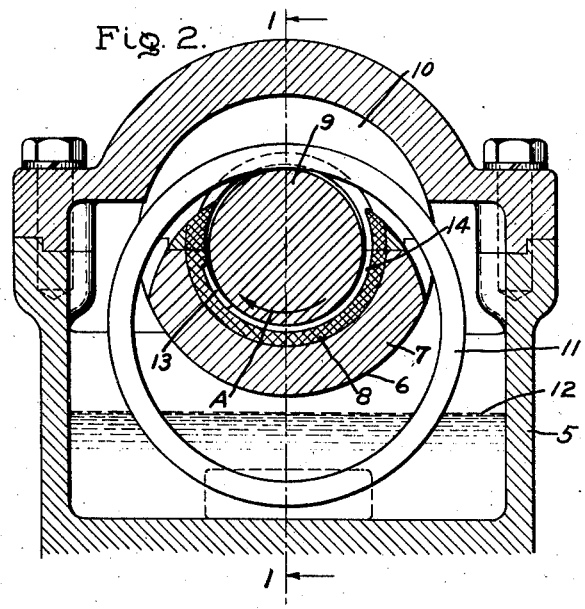

In the drawing, Fig. 1 is a longitudinal sectional view of a bearing embodying my invention, the section being taken on line 1—1, Fig. 2, and a part of the shaft being broken away, and Fig. 2 is a transverse sectional view taken on line 2—2, Fig. 1.

Referring to the drawing, 5 indicates a bearing housing and support provided with a spherical seat 6 in which is mounted a bearing block 7 provided with a bearing lining 8. Mounted in the bearing is a shaft 9. In the upper portion of the bearing block and lining is a transverse groove 10 in which an oil ring 11 runs. The oil ring hangs on shaft 9 and dips down into a supply of oil 12 in the bottom of housing 5. As shaft 9 rotates the oil ring is caused to turn or rotate, running on shaft 9, and in so doing it acts as a pump to carry oil from the well in the bottom of housing 5 up onto the top of shaft 9. The arrangement so far as described is that of a bearing provided with an oil ring for lubricating it. Such arrangements are well known and the manner in which the oil is pumped up by the oil ring is well understood. It is to be taken as typical of any suitable bearing structure lubricated by an oil ring.

Now according to my invention I provide a longitudinally-extending groove 13 in the bearing lining, which groove is located beyond the line of contact between the shaft and the bearing lining as regards the direction of rotation of the shaft, and I connect such groove to groove 10 in which the oil ring runs by a circumferentially-extending groove 14 which crosses such line of contact. By the line of contact I mean the line on which the shaft and bearing lining contact when at rest, due to the load on the shaft. Groove 13 extends throughout substantially the full length of the bearing and is of suitable depth and width to hold and distribute the oil brought to it, and groove 14 is of a size to readily carry the oil pumped up by the oil ring to groove 13. In the present instance, it is assumed that the line of contact is at the bottom of the bearing, and that the direction of rotation of the shaft is that indicated by the arrow A, so that in this particular case the groove 13 is located on the side of the bearing at which the direction of rotation of the shaft is upward, and groove 14 extends from the other side of the bearing down around the bottom of the bearing.

In the lubrication of a bearing, the oil performs two important functions, first that of maintaining an oil film at the line of contact between the shaft and the bearing for the shaft to turn on, and second, that of providing a medium which absorbs and carries away heat generated in the bearing. As to the first function, only a very thin oil film is required but it is very important that it be maintained and that it be changed continuously so that the film is formed always of fresh cool oil. This requires that the oil be evenly distributed along the line of contact between the shaft and the bearing and that an oil supply be always present at such line of contact. As to the second function, this requires that a large quantity of oil be circulated through the bearing to absorb and carry away the heat generated in the bearing. Both of these functions are accomplished by my improved bearing structure in a most satisfactory manner.

An oil ring, such as the ring 11, is capable of carrying a considerable amount of oil up to the top of the shaft, and it will be clear that by my invention this oil is fed to groove 14 through which it flows to groove 13. The flow of the oil through groove 13 is very materially assisted by the rotation of the shaft which has a pumping effect on the oil and serves to effect rapid passage of the oil through groove 14 to groove 13. In groove 13 the oil readily spreads in both directions, completely filling the groove and here again the pumping action of the shaft comes into play to carry the oil from groove 13 up over the top of the shaft and down the other side thereof. Of this oil, a part passes under the shaft to continuously renew the oil film and the remainder flows out at the ends of the bearing or through suitable openings which may be provided for this purpose. By this arrangement I am enabled in connection with a bearing lubricated by an oil ring to effect the flow of a large volume of oil through the bearing and to provide an even distribution of the oil throughout the length of the bearing so that a constantly changing, continuous solid oil film is assured at the line of contact between the shaft and the bearing. As a result the bearing is very efficiently cooled and lubricated.

It will be understood in connection with an ordinary bearing, that there is always some clearance between the shaft and the bearing so that there is space for the passage of oil around the shaft. Such clearance is indicated in Fig. 2 although the amount is exaggerated for purposes of illustration.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:—

1. In a bearing structure, the combination of a bearing block, a shaft therein, a groove in the bearing block, an oil ring which runs in such grooves, a longitudinally-extending groove in the bearing block, said groove being located beyond the line of contact between the shaft and bearing block as regards the direction of rotation of the shaft, and a circumferentially-extending groove in the bearing block which connects the first-named groove to the longitudinally-extending groove.

2. In a bearing structure, the combination of a bearing block, a shaft therein which rests on the bottom of the bearing block, a groove in the bearing block, an oil ring which runs in such groove, a longitudinally-extending groove in the bearing block, said groove being located in the side of the bearing at which the rotation of the shaft is upward, and a circumferentially-extending groove in the block which passes under the shaft and connects the first-named groove to the longitudinally-extending groove.

3. In a bearing structure, the combination of a bearing block, a shaft therein, a groove in the bearing block, an oil ring which runs in such groove, a longitudinally-extending groove in the bearing block, said groove being located beyond the line of contact between the shaft and bearing block as regards the direction of rotation of the shaft, and means forming a passage which serves to convey oil carried up to the shaft by the oil ring to said longitudinally-extending groove.

In witness whereof, I have hereunto set my hand this 1st day of April, 1924.

EMERY G. GILSON.